Oct. 11, 1955
W. S. JAMES
2,720,279
PLEATED PAPER CARBURETOR AIR FILTER
Filed April 2, 1953
2 Sheets-Sheet 1
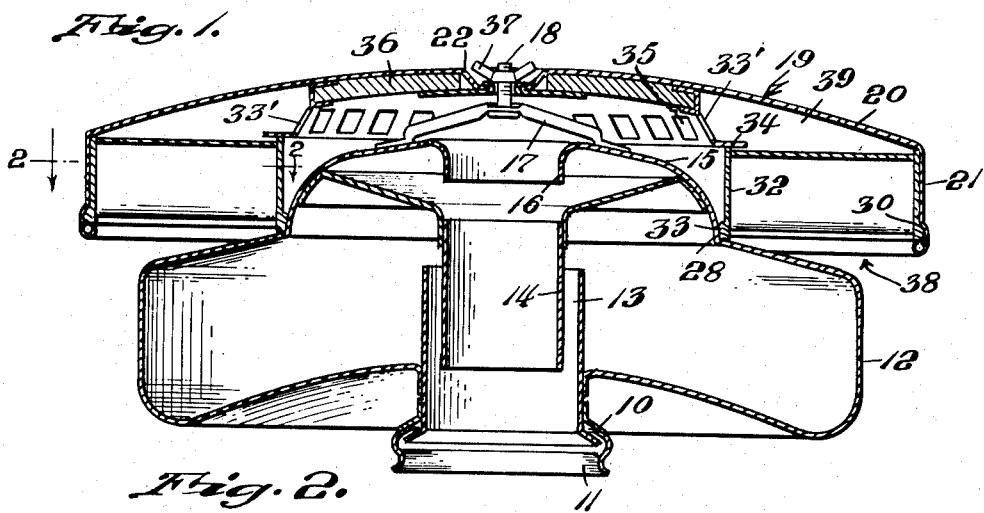
INVENTOR.
William S. James
BY
Barlow & Barlow
ATTORNEYS.

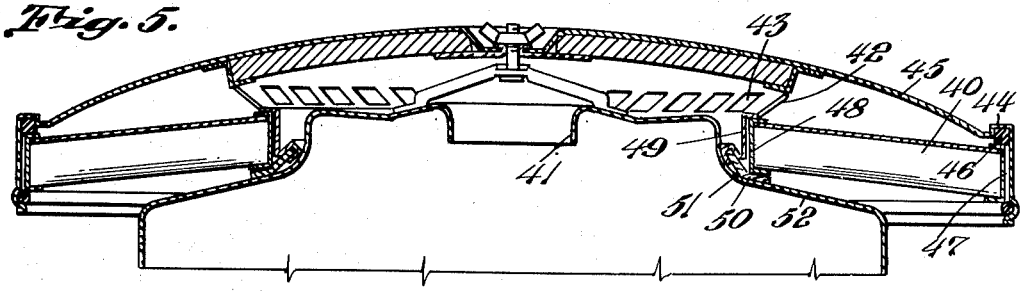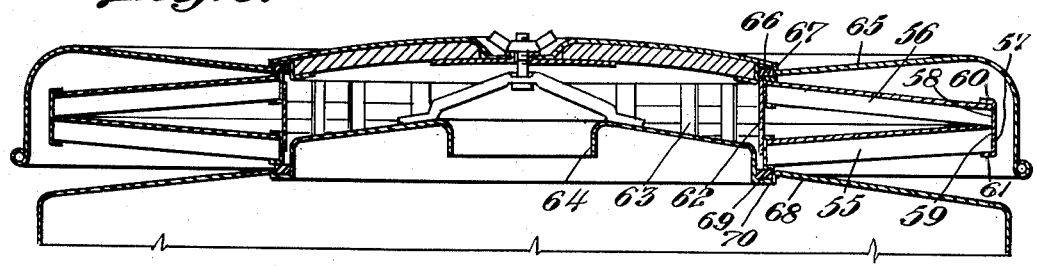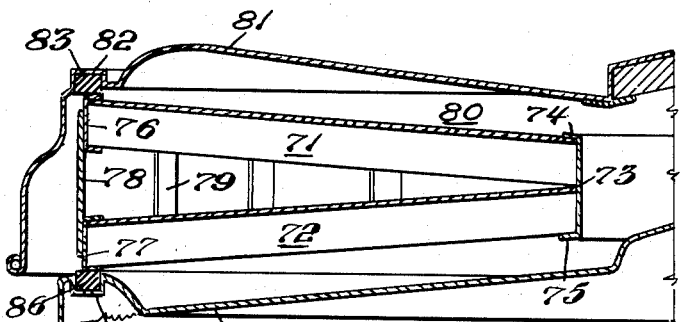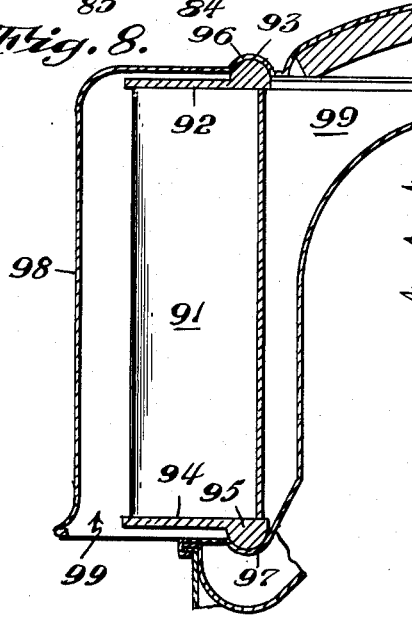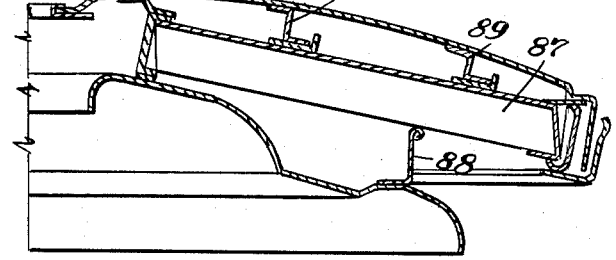
INVENTOR.
William S. James
BY
Barlow & Barlow
ATTORNEYS.

United States Patent Office 2,720,279
Patented Oct. 11, 1955

2,720,279
PLEATED PAPER CARBURETOR AIR FILTER

William S. James, Providence, R. I., assignor to Fram Corporation, a corporation of Rhode Island Application April 2, 1953, Serial No. 346,500

1 Claim. (Cl. 183—71)

This invention relates to an air filter and particularly to an air filter for the air used in the carburetor or the like.

In the use of paper for air filtration, a large area is required for passing the required volume of air without undue restriction to the flow of air; consequently, filters of this character have been rather bulky and generally not adaptable where space limitations are involved.

One of the objects of this invention is to provide an air filter which may be used where there is limited vertical space.

Another object of the invention is to provide an air filter which may be used with a silencer or a resonator, for the intake air, and yet will fit into a location where there is vertical space limitation.

Another object of this invention is to utilize lateral space as distinguished from vertical space, which latter extends in the direction of the axis of the air passage.

Another object of this invention is to provide a filter of the dry-type, one not requiring oil for the collection of dust or dirt to be removed from the air.

Another object of the invention is to provide a filter of paper which may be so treated that dust will not unduly adhere to the same.

Another object of the invention is to provide a paper filter which will not ignite by backfiring of the engine through the carburetor.

Another object of the invention is to provide a paper filter element which may be readily replaced with a fresh paper element when occasion should require.

With these and other objects in view, the invention will be explained in the following specification and more particularly set forth in the appended claim.

With reference to the drawings,

Fig. 1 is a vertical sectional view of the filter, shown as applied to a resonator and air conduit to a carburetor.

Fig. 2 is a section on line 2—2 of Fig. 1, showing a fragmental portion of the pleated paper filter.

Fig. 3 is a section on line 3—3 of Fig. 2.

Fig. 4 is a perspective view of the pleated paper, which forms the essential part of the filter element.

Fig. 5 is a sectional view of the filter mounted upon a framework of modified form from that shown in Fig. 1.

Fig. 6 is a view similar to Fig. 5, of a still different modification.

Fig. 7 is a view similar to Fig. 6, but showing a still different modified form, and being of less than one-half of the structure shown in Fig. 6.

Fig. 8 is a sectional view of a filter, showing approximately the same portion as shown in Fig. 7, but showing a different modification.

Fig. 9 is a sectional fragmental view of a still different modification, showing part of the whole filter.

In proceeding with this invention, I mount upon the air flow conduit to the carburetor, about which a silencer is located, a pancake-type of pleated paper suitably supported in a rigid housing and prevented from distortion so that a small vertical extent is occupied yet an extended surface area is provided extending radially from the axis of the air conduit. The ends of these pleats of paper are sealed with a rubber-like material so that air will not escape at the pleated end but will pass through the porous pleated paper. No liquid for contacting the air to remove any of the dust therein is utilized.

With reference to the drawings, 10 designates an air conduit which may be threaded, as in 11, for attachment to the central air flow passage of a carburetor. This conduit has mounted thereon a silencer, designated generally 12, having an entrance passageway 13 thereto so that the air which passes in through the tube 14 may be quieted as to any vibrations which may be set up therein. This tube 14, is supported from the top wall 15 of the silencer, which is inwardly flanged as at 16 for the passage of air through the tube 14. A spider-type bracket 17 is mounted upon this top wall 15 to bridge the passage and has a threaded stud 18 extended upwardly therefrom, upon which there is mounted the filter unit 19, comprising an inverted disc-shaped shell having a top wall 20 and downward extended flange 21, the top wall 20 being bent inwardly as at 22 and provided with an opening to receive the threaded stud 18.

The filter element is designated generally 25 and consists of paper folded or pleated, as shown best in Figs. 3 and 4. The paper is folded along equally spaced lines 26 and 27 to provide a zigzag formation, as shown in Figs. 3 and 4. The length of each of the folds 26 and 27 is substantially the distance between the flange 21 and a point 28 at the juncture of two differently disposed extents of the resonator 12. This pleated paper is disposed in an annulus with its outer periphery 29 (Fig. 2) sealed along the flange 21 by some sort of soft material such as rubber or synthetic rubber 30, while its inner edge 31 is sealed by a similar material 32, which may be enlarged as at 33 (see Fig. 1) so as to fit in the juncture 28 and provide an air-tight seal therewith. In order to hold down the inner edge of this pleated paper material, there is an annulus $33^1$ provided with a flange 34 to engage the upper edge of the seal 32 and the upper inner edge of the folded pleated paper, as shown in Fig. 1. This annulus is perforated with a plurality of holes 35 so that air may readily pass therethrough. Some soft material such as 36 may be located at the upper edge of this member $33^1$, which also provides a cushion or sound-absorbing surface on the inner surface of top wall 20 of the air cartridge. This unit 19 may be assembled on the stud 18 and held thereon by wing nut 37, which presses the unit 19 downward so as to provide the seal between the gasket portion 33 and the resonator at the location of juncture 28. When so assembled, air may pass upwardly, as shown by arrow 38, through the paper and into the chamber 39, thence through the openings 35 and downward through the flange 16, tube 14, and conduit 11 to the carburetor.

The paper may be treated with any suitable water-proofing material and will also be treated with some material to minimize the adhesion of dust thereto; such, for instance, as a silane compound. Thus, the vibrations of the engine will serve in a large measure to shake the dust from the under-surface of the pleated paper. The paper may also be treated with a flame resistant chemical such as tricresyl phosphate or one of the borax or ammonium salts, which will materially assist in preventing the combustion of the paper should there be a backfire of the engine.

In some cases there may be a different arrangement of the pleated paper than shown in Fig. 1 and in Fig. 5. I have illustrated pleated paper at 40 as inclined slightly to a plane at right angles to the axis of the air conduit 41. Likewise, there is a variation of the supporting member 42 with its openings 43. In this case, there is a recess 44 in the top of the shell 45 and a soft gasket material 46 is located in this recess in engagement with the upper edge of the pleated paper 40. Some seal 47, however, must be provided at the outer periphery of the element 40; likewise a seal 48 is provided at the inner edge of the annulus 40 which cooperates with the portion 49 of the member 42. A soft gasket 50 is provided as a separate element for assisting in sealing the pleated paper 40 at its inner edge along the curved portion 51 of the wall 52 of the resonator.

In some cases, where a greater area of pleated paper is desired, the element (Fig. 6) will be provided with two sections of pleated paper, one designated 55 and the other 56, which have their outer edges 57 and 58 contiguous and sealed by a band 59 flanged as at 60 and 61, while the inner edges of the sections 55 and 56 are spaced by reason of the sections proceeding along flaring paths, and engage annulus 62, which is perforated as at 63 so that air passing through the pleated paper sections will be discharged from an area between them through the openings 63, thence passing through the flanged opening 64 to the air conduits to the carburetor. The upper wall 65 of the housing for the paper sections is provided with a sealing gasket 66 and offset portion 67, while the upper wall 68 of the resonator section is provided with a recess 70 in this upper wall 68 in which is located the gasket 69 for the sealing of the pleated paper unit therein.

In Fig. 7, I have illustrated pleated paper sections, designated 71 and 72, as in the inverse relation with reference to the sections described in Fig. 6. The units 71 and 72 are spaced apart at their outer peripheral edges, while they are in contiguous relation at their inner edges and are sealed at their inner edges by a band 73 flanged as at 74 and 75, as shown. A seal is also provided at the outer edge of the section 71, as at 76 and at the outer edge of the section 72, as at 77. In this case, the band 78 which supports these sections admits air through the openings 79 in the band from whence it passes through the section 71 and 72 into the chamber 80 and thence through the center opening to the air conduit to the carburetor. The top wall 81 of the shell is formed, as at 82, to receive the gasket 83 to seal the upper edge of the paper section 71, while the top wall 84 of the resonator is formed as at 85 to receive the soft gasket 86 to receive the outer periphery edge of the lower paper section 72.

With reference to Fig. 9, I have shown a construction similar to Fig. 5, with this view showing the pleated paper 87 being supported from below by a bracket 88 and supported from above by brackets 89 and 90 so that the pleated paper, when of an extended radial length, will not collapse or be thrown out of place due to differential pressures on either side of it.

In Fig. 8, the pleated paper 91 is shown as disposed vertically and provided with seals 92 at the top, enlarged as at 93 at its inner edge and 94 at the bottom, enlarged at 95 at its inner edge, providing an air-tight seal. In this case, the air enters the shell 98, as at arrow 99, passes through the section 91 into the chamber 99 and thence to the center conduit to the carburetor.

In all of the cases, the folded lines of the pleated paper, or the pleated paper itself, extend substantially radially of the axis of the air conduit to the carburetor and while in most cases this axis is vertically shown, because of the paper being dry and the air cleaner not having any liquid in it, the axis may be disposed at an angle to the vertical when required. However, the radial extent from this axis permits almost indefinite extent of the paper so that a large surface area may be presented and an adequate flow of air, without undue restriction, provided. The vertical or axial extent of the pleated paper may thus be materially restricted or diminished by increasing the area of the paper lateral therefrom which will enable this filter to be placed in the space available under the hood of an automobile where vertical space is restricted.

I claim:

In an air filter, a relatively flat circular housing closed at its upper end by a comparatively flat top and having a central downwardly extending tube that forms a discharge for the filtered air, an annular filter element formed of porous pleated paper supported under said top and near the same and having its pleats extending approximately horizontally and radially towards said tube, and means for closing the outer and inner ends of the pleats so that the air to be filtered passes upwardly through the pleated paper and then laterally adjacent said top to flow downwardly through the central tube.

References Cited in the file of this patent

UNITED STATES PATENTS

| | | |
|---|---|---|
| 2,122,111 | Poelman et al. | June 28, 1938 |
| 2,122,514 | Crocker | July 5, 1938 |
| 2,510,440 | Vokes | June 6, 1950 |
| 2,556,722 | Hersberger | June 12, 1951 |
| 2,568,384 | Cheronis | Sept. 18, 1951 |
| 2,632,526 | Brock et al. | Mar. 24, 1953 |
| 2,640,000 | Seyb | May 26, 1953 |

FOREIGN PATENTS

| | | |
|---|---|---|
| 367,009 | Great Britain | Feb. 10, 1932 |
| 521,344 | Great Britain | May 20, 1940 |
| 527,226 | Great Britain | Oct. 4, 1940 |
| 834,495 | France | Aug. 22, 1938 |
| 998,981 | France | Sept. 26, 1951 |